T. W. GREEN.
MULTISTAGE CENTRIFUGAL BLOWER.
APPLICATION FILED JUNE 6, 1914.

1,136,330.

Patented Apr. 20, 1915.

3 SHEETS—SHEET 1.

WITNESSES

INVENTOR

BY

ATTORNEY

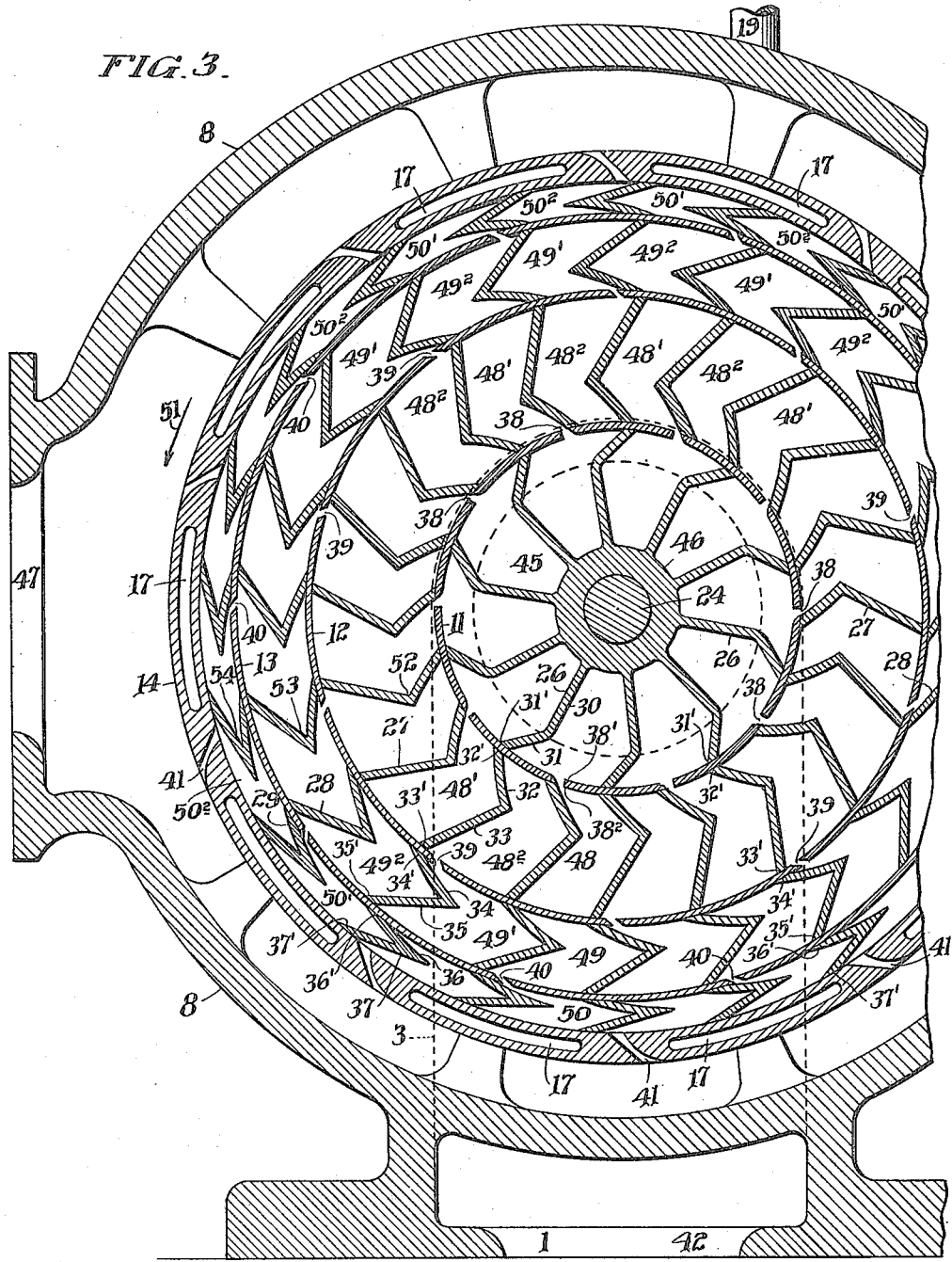

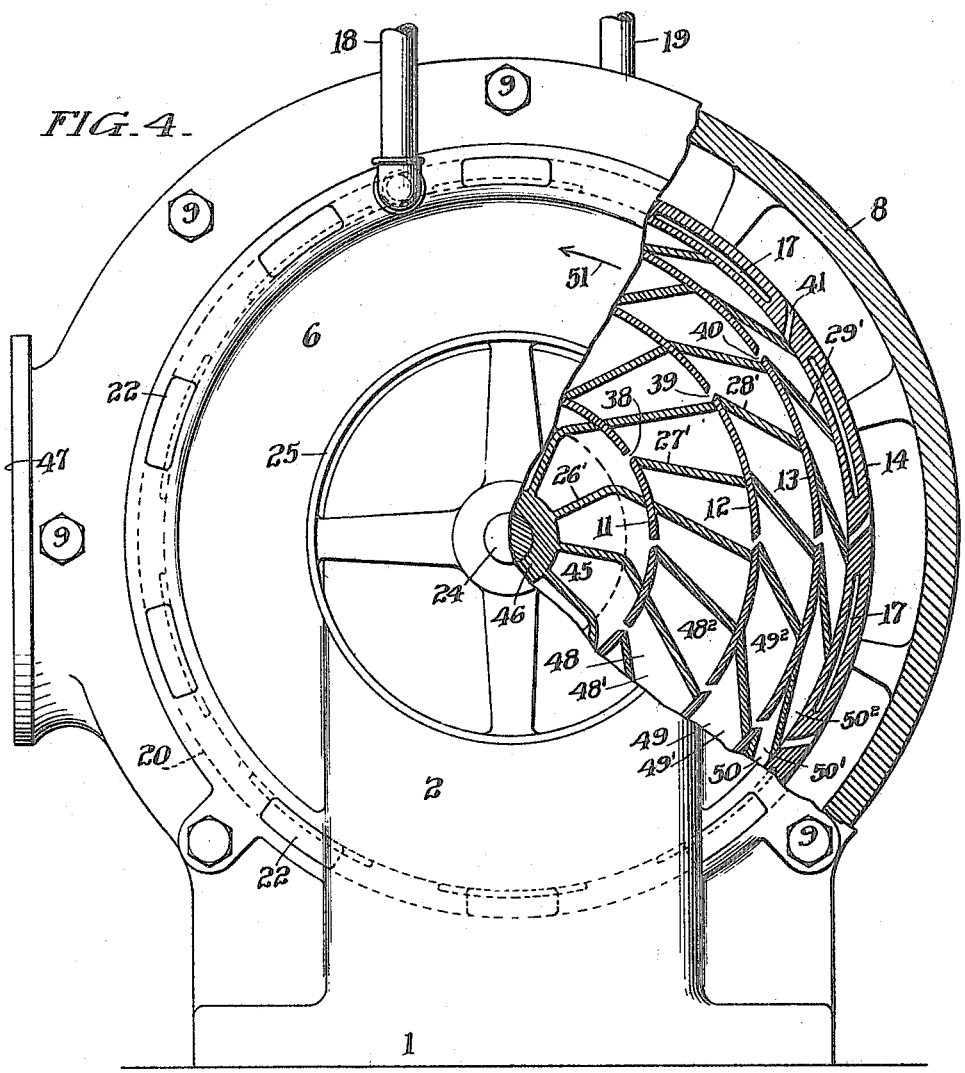

UNITED STATES PATENT OFFICE.

THOMAS W. GREEN, OF PHILADELPHIA, PENNSYLVANIA.

MULTISTAGE CENTRIFUGAL BLOWER.

1,136,330.   Specification of Letters Patent.   Patented Apr. 20, 1915.

Application filed June 6, 1914. Serial No. 843,340.

*To all whom it may concern:*

Be it known that I, THOMAS W. GREEN, a citizen of the United States, residing at 1319 West Lehigh avenue, Philadelphia, in the county of Philadelphia and State of Pennsylvania, have invented a certain new and useful Multistage Centrifugal Blower, of which the following is a specification.

The purpose of my invention is to arrange the several stages of a compression blower about a common axis within successively inclosing cylindrical compartments.

A further purpose of my invention is to force air outwardly from an inlet near the axis of the rotating parts to successively inclosing compartments and to trap or cut off the air between the successive compartments, making the compartments of smaller cross sectional area as the distance from the axis increases in order that the air may be compressed.

Further purposes of my invention will appear in the specification and claims thereof.

I have preferred to illustrate my invention by two forms thereof, which have proved to be simple, practical, efficient and relatively inexpensive and which at the same time well illustrate the principles of my invention.

Figure 1:
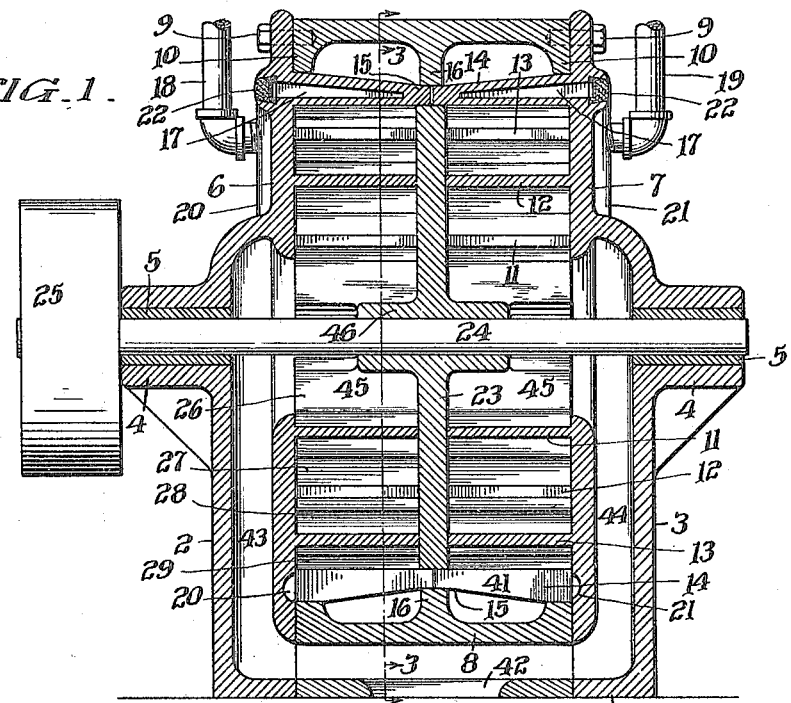
Figure 2:
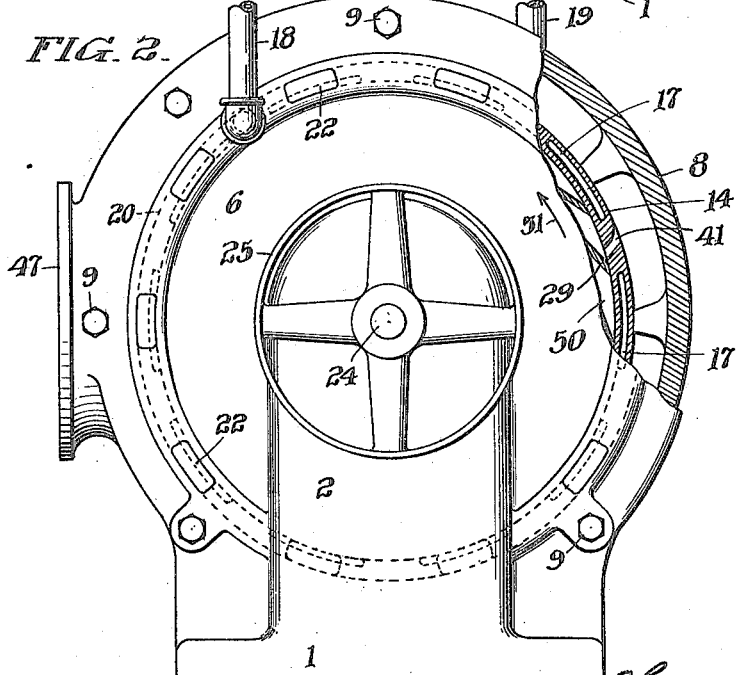

Figure 1 is a vertically central section of the preferred form of my invention. Fig. 2 is an end elevation, partly broken away, of the structure shown in Fig. 1. Fig. 3 is an enlarged broken section upon lines 3—3 of Fig. 1. Fig. 4 is an end elevation, partly in section showing a second form of my invention.

In the drawings similar numerals of reference indicate like parts.

My invention relates to that type of blower in which the air is driven from one compartment to another of smaller capacity within the same machine, the successive compartments within which compression takes place being known as stages. In my construction the stages are arranged about a common axis at different distances from the center and the inlet air is cut off, in each compartment, while the air is being driven from this compartment to the next.

The frame of my blower comprises a base 1 and supports 2, 3 channeled for air passage and carrying the bearings 4, babbitted at 5. The drum ends 6, 7 are preferably integral with the supports 2, 3, respectively and are rigidly joined to a generally cylindrical drum casing 8 by bolts 9 entering ears 10. The ends are thus also made rigid with respect to each other by the casing. The ends 6, 7 and the cylindrical casing together form a complete closure for the operating parts of my blower. Each end 6, 7 carries a series of partitions of interrupted cylindrical form shown respectively at 11, 12, 13 and 14. The outer partitions are preferably of tapered form, as at 15 as best seen in Fig. 1, tapering toward the center and adapted there to engage with a central, annular, inwardly directed web 16 upon the casing.

The generally cylindrical partitions 14 are shown as extending axially toward each other, substantially into contact, and as provided with water jacketing compartments 17, supplied and given circulation by water pipes 18, 19 upon the ends of the casing. The compartments are connected in pairs of sets, by annular channels 20, 21 upon opposite ends. The ends of the compartments 17, left open for core withdrawal during manufacture, are closed as at 22 in any suitable manner.

The inner annular generally cylindrical partitions 11, 12 and 13 also extend axially toward each other, but do not extend so nearly in contact as the partitions 14, and are finished at the ends to give space for a disk or web 23, carried by the shaft 24 and driven by any suitable means, here shown as pulley 25.

The disk or web 23 is preferably a close rotating fit between the ends of the partitions whatever their number, here 11, 12 and 13, and carries oppositely directed blades, shown in a series of annularly arranged sets of blades of which I have considered it desirable to illustrate but two of the various species which those familiar with the art will appreciate could be used to carry out my invention. These two species are shown at 26, 27, 28 and 29 (Fig. 3) and 26', 27', 28' and 29' (Fig. 4). The blades in my preferred form shown in Fig. 3 comprise angularly disposed pairs of wings 30 and 31, 32 and 33, 34 and 35, 36 and 37. The blades all extend axially from the disk or web 23 and, in my best form are balanced by location in duplicate upon opposite sides of this disk or web, to coöperate with the duplicate axially-extending partitions which face the disk or web upon opposite sides.

Whatever the form of blade whether formed in a single wing or in a plurality of wings, all of the sets of blades have a common axis in the shaft 24. The outer ends (axially) of the sets of blades fit closely against inner surfaces of the respective ends 6, 7 and rotate within the partitions, close enough to the ends (axially) and to the partitions (radially) to reduce leakage to a minimum.

In my preferred form the blades are made concave at the back for the purpose of forming a relatively reduced pressure if not a partial vacuum at this point, to reduce the resistance to air inlet, and also with a view to using the rearwardly extending inner part of the blade to keep the inlet port open as long as possible. This is due largely to the inertia of the air particles by reason of which they do not follow the front blade but are rather crowded upon the front face of the rear blade in each compartment. This obtains the effect of an almost radial blade and almost purely radial movement of the air. The peaks or forward edges of the blades are located near enough to the inner partitions so that the loss of outwardly wedging action of this part of the blades is less than the advantages attained as enumerated above. In both forms shown it will be noted that the flow of air from stage to stage is assisted by centrifugal force and that the ports by which air is admitted to one set of alternating chambers are closed before the outer ports are opened from this set so that air may be forced outwardly to the next (smaller) set of chambers.

Taking up now the form shown in Fig. 3, the angles formed by the junction of the two wings of each blade are preferably more acute in the outer sets than in the inner sets. Both the outer and the inner wings slope rearwardly, in the illustration, in the direction of rotation, from their meeting edge. The several partitions 11, 12, 13 and 14 are cylindrical in those faces adjoining the rotatable blades 26, 27, 28 and 29 but are not complete cylinders, by reason of their interruption at intervals to provide ports 38, 39, 40 and 41, respectively, through which the air is forced during its outward passage. The air enters the inlet opening 42 and traverses the channels 43, 44 to the receiving space 45 surrounding the hub 46 of the disk 23. It is discharged through outlet 47. The spacing for the ports 38, 39, 40 and 41 may be angularly the same in all of the partitions, but the ports in the successive partitions are preferably staggered with respect to the successive sets of blades to reduce air friction and air leakage and, particularly, to facilitate cut-off during compression.

It will be noted that the ports 38, 39 and 40 admit the air to the successive annular spaces or compartments 48, 49 and 50 at an inclination generally in the direction of rotation of the blades, as indicated by the arrow at 51, and that the slopes of the forward faces of the wings 32, 34 and 36 correspond nearly with the angle at which the air is forced into the successive compartments in which the sets of blades revolve, so that the pockets or concavities 52, 53, 54 formed upon the reverse sides of these successive blades may be made available for reception of the air received in the successive compartments to the best advantage, i. e., with very slight loss of impelling force. The spaces between the wings 32, 34 and 36 and the respectively adjoining partitions 11, 12 and 13 become in effect ducts or passages by which the air is admitted from the ports 38, 39 and 40 to the several annular compartments for a longer time or at a later point in the travel of the blades than would otherwise be the case.

In operation, the web carrying the blades is driven by rotation of shaft 24. The air passes through the inlet 42 into receiving space 45 and the inner part of this space, nearest the shaft, forms a receiving compartment merely. The outer wings 31 are effective to force the air through the ports 38 into the chambers 48′ of compartment 48 which is of smaller capacity than the space 45, resulting in slight compression of the air above that of the atmosphere. The blades in the receiving space are fewer in number than those in the outer compartments and are preferably always open to some sets of the outer chambers. As shown they always connect with one of the two sets of alternating chambers 48′ or $48^2$ in the compartment 48. The numerals 48′, 49′ and 50′ have been applied to those chambers which are receiving air and $48^2$, $49^2$ and $50^2$ have been applied to those (alternating) chambers which are discharging air.

It will be evident that this view of the spaces indicated as "chambers" is a mere convenience for tracing out the path of the air at any particular time as each of these "chambers" is not only advancing continually about the space between the partitions but is changing its character, being a receiving chamber while the two blades which limit is span a port in the inside partition and becoming a discharging chamber when these same blades cease to span this port but span a port in the outer partition instead. The names given them are means of designation in a particular position with respect to the ports, recurring at intervals, and shown in the drawings.

As soon as the outer edge 31′ of the blade wing 31 reaches the forward edge 38′ of the port 38, the inner edge 32′ of the wing 32 also seals against the forward edge $38^2$ of the port, preventing return of any of the air which has been forced into this chamber (now designated as $48^2$, because it is transmitting air and not receiving it) of compartment 48. During the latter part of the movement, this chamber 48² is not opposite any of the ports 28, but just as this sealing takes place, this chamber 48² is brought into communication with a port 39 and the air within it is forced through this port by operation of the wing 33, substantially emptying this chamber 48² into a chamber 49' of compartment 49 where a corresponding sealing will take place, with the further movement of the blades, between the edge 33' of the wing 33 against the edge of the port 39 on the inside, at the same time that the edge 34' of the wing 34 seals against the edge of the port 39 on the outside. These successive fillings under compression and discharges into compartments of smaller capacity, proceed outwardly through the entire number of stages utilized. Edges 35' and 36' of wings 35 and 36 seal inside and outside respectively against the edges of ports 40 and edges 37' of wings 37 against the inside edges of ports 41. The air which has passed through ports 41 is kept from return to the compartments 50² by reason of the outward pressure of the air from these compartments at all times and consequently passes out through the outlet 47. The operation proceeds progressively, each compartment 49', 50' being sealed against outward flow of air from it during the time when it is filling with air from the inner compartment and then becoming a compartment 49² or 50² for discharge into the next outer compartment.

The successive chambers within each compartment take turns in receiving and emptying their content, the one receiving from the compartment interior to it at the same time that the adjoining chamber is emptying its content to the compartment outside of it and this action is taking place at all times throughout the compartments 48, 49 and 50.

It will be seen that not only are the conditions of adjoining chambers different within each compartment one receiving air while the other is discharging it, but that the conditions of chambers in compartments lying within the same radial line are likewise different, one receiving air while the other is discharging it; and that each of these sets of chambers in turn occupies the relative position and performs the function previously and subsequently occupied and performed by its adjoining chamber.

In the form shown in Fig. 4 the web and end plates are shown as unchanged. The successive compartments grow smaller as the distance radially from the center increases, utilizing the same or similar partitions to those shown in Fig. 3. The blades 27', 28' and 29', are shown as substantially plane surfaces, however, instead of comprising pairs of angularly placed wings forming a concavity in the rear at their junction and providing a prolonged inlet opening at the inner edge, as in Fig. 3. This extends the inner blade edges so that each of the chambers communicates with those chambers of the next inner compartment slightly in advance of the time when communication would be had if the inner portion of the blade were sloped backward as in Fig. 3.

The successive alternations of "receiving" chambers closed at the outer side and "discharging" chambers closed at the inner side is characteristic of this form also. At any given time the chambers alternate in character within the same compartment, those adjoining circumferentially differing as indicated in regard to Fig. 3. The adjoining chambers in different compartments, i. e. in the same general radial direction from the center, also differ in character, one being a receiving compartment and the next a discharging compartment. The character of each of these chambers is also regularly changing with the normal revolution of the blades, as explained more fully in describing the preferred form. In this form of Fig. 4 the continuation of the outer part of the blade to the inner partition as a continuous, though not necessarily uniform, wedge, gives an advantage in the extent of outward wedging action of the blade upon the air contained in the chamber, giving a greater effect from this cause than in my preferred form, but losing the advantage of the relatively reduced pressure and of the more nearly radial movement of the air in that form.

I recognize that a great variety of blade shapes might be used to gain the several advantages of these two types in differing degrees and that the effective faces need not be plain surfaces.

Having thus described my invention, what I claim as new and desire to secure by Letters Patent is:—

1. In a centrifugal air blower, a shaft, a web rotatable about the shaft, a plurality of concentric, successively-inclosing partitions extending toward the web and of general cylindrical form, interrupted at intervals by ports, a casing surrounding the partitions, a support for the partitions closing the ends of the casing and a plurality of sets of blades carried by the web, one set of blades projecting between each adjoining pair of partitions and having a greater number of blades than there are ports in the adjoining partition.

2. In a centrifugal air blower, a shaft, a web rotatable about the shaft, a plurality of concentric partitions extending toward the web and of generally cylindrical form, provided with ports at intervals, a support for the partitions closing the space between them and a plurality of sets of blades carried by the web to fit between adjoining partitions to form chambers in a circumferential line communicating with chambers interior and exterior radially thereto respectively and sloped to close against air communication in an outer direction radially while receiving air from the interior.

3. In a centrifugal air blower, a shaft carrying a web, a support, partitions of generally cylindrical form provided with ports, mounted upon the support, blades mounted upon the web to fit between the partitions and adapted to form chambers between the adjoining blades, bounded upon the outside and the inside by the partitions, each chamber communicating with a port upon the inside when closed against communication with a port upon the outside radially and vice versa.

4. In a centrifugal air blower, a shaft, bearings therefor, a web mounted upon the shaft, blades mounted upon the web in annular series and extending axially therefrom, an end casing member, cylindrical partitions secured thereto fitting between the annular series of blades and provided with ports in number half of the number of blades in the adjoining annular set.

5. In a centrifugal blower, a shaft, means for mounting the shaft, a web upon the shaft, oppositely-directed, axially-extending, concentric sets of blower blades upon the web, a generally cylindrical casing surrounding the web and blades, ends for the casing and concentric, axially-extending partitions upon the ends adapted to enter between and coöperate with the sets of blades.

6. In a centrifugal blower, a shaft, supports for mounting the shaft containing an air passage, a web carried by the shaft, three annularly arranged sets of blades upon the web surrounding the shaft, the inner one being adapted to receive air from said passage, three concentric cylindrical ported partitions extending toward the web and coöperating with the respective sets of blades, and a support for the partitions.

7. In a centrifugal blower, a pair of supports providing air passages, bearings mounted upon the supports, a shaft in said bearings, a web carried by said shaft, a plurality of oppositely directed axially extending blades carried by the web, a substantially cylindrical casing surrounding the web, ends rigidly connected with the casing, and axially extending concentric partitions rigidly mounted with respect to the ends so as to lie outside the blades and inside of them respectively and ported to allow inlet and outlet of fluid to and from the spaces between the blades.

8. In a centrifugal blower, a pair of supports, bearings carried thereby, a shaft mounted in said bearings, a web carried by the shaft, a substantially cylindrical casing surrounding the web, casing ends united to the casing, a plurality of axially-extending, concentric partitions upon the ends extending toward the web and having ports at regular intervals and a plurality of annular sets of blades axially extending in opposite directions from the web, lying between and adapted to coöperate with the partitions and in number in each set corresponding to twice the number of ports in one of the partitions.

9. In a centrifugal blower, a fixed element comprising supports, end pieces and a casing joining the end pieces, a series of concentric partitions axially-extending, rigid with respect to one end piece and ported at intervals, a shaft, bearings for the shaft, a disk mounted upon the shaft and a plurality of sets of axially-extending, annularly-arranged blades mounted to rotate with the disk between the partitions and having a number of blades in a set equal to twice the number of ports in the partition lying next inside of the set of blades.

10. In a centrifugal blower, a plurality of concentric, generally cylindrical partitions ported at intervals, a rotatable member, a plurality of concentric, annularly-arranged sets of blades extending axially with respect to the partitions and in number twice the number of the ports in each internally-adjoining partition and sloping so that each chamber formed by the blades with adjoining partitions will have communication with an inner or outer port at substantially all times but not with both for any appreciable time, in combination with a casing and ends provided with air inlet and outlet openings, surrounding the partitions and blades and supporting the partitions.

THOMAS W. GREEN.

Witnesses:
J. LUTHERIA KAUFFMAN,
GERTRUDE BADER.

Copies of this patent may be obtained for five cents each, by addressing the "Commissioner of Patents, Washington, D. C."